(12) United States Patent
Yen et al.

(10) Patent No.: US 12,535,856 B2
(45) Date of Patent: *Jan. 27, 2026

(54) FOLDABLE ELECTRONIC DEVICE

(71) Applicant: SYNCMOLD ENTERPRISE CORP., New Taipei (TW)

(72) Inventors: Ching-Hui Yen, New Taipei (TW); Chun-Hao Huang, New Taipei (TW); Chien-Cheng Yeh, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 305 days.

This patent is subject to a terminal disclaimer.

(21) Appl. No.: 18/532,309

(22) Filed: Dec. 7, 2023

(65) Prior Publication Data

US 2024/0236216 A1 Jul. 11, 2024

(30) Foreign Application Priority Data

Jan. 6, 2023 (TW) ................................ 112200180

(51) Int. Cl.
*G06F 1/16* (2006.01)
*H04M 1/02* (2006.01)

(52) U.S. Cl.
CPC .......... *G06F 1/1641* (2013.01); *G06F 1/1652* (2013.01); *H04M 1/0216* (2013.01); *H04M 1/0268* (2013.01)

(58) Field of Classification Search
CPC .......... H04M 1/021–022; G06F 1/1681; G06F 1/1652; G06F 1/1641
See application file for complete search history.

(56) References Cited

U.S. PATENT DOCUMENTS

| | | | | |
|---|---|---|---|---|
| 12,058,826 B2* | 8/2024 | Feng | ...................... | G06F 1/1616 |
| 12,093,087 B2* | 9/2024 | Liu | ........................ | H04M 1/022 |
| 12,381,969 B2* | 8/2025 | Huang | .................. | H04M 1/022 |
| 12,429,924 B2* | 9/2025 | Feng | ........................ | G06F 1/16 |
| 12,432,287 B2* | 9/2025 | Huang | ................ | H04M 1/0216 |
| 12,445,544 B2* | 10/2025 | Yen | ........................ | H04M 1/022 |
| 12,455,596 B2* | 10/2025 | Yen | ........................ | G06F 1/1641 |

(Continued)

FOREIGN PATENT DOCUMENTS

CN 215058843 U * 12/2021
CN 215110042 U * 12/2021

*Primary Examiner* — Patrick F Marinelli
(74) *Attorney, Agent, or Firm* — Studebaker Brackett PLLC

(57) ABSTRACT

A foldable electronic device is provided and includes a central base, a pivot module, two wing members, two transmission members, two panel bodies, a synchronization module, an elastic module and a flexible screen. The pivot module is disposed in the central base and can reverse synchronously. The wing members can pivot relative to the central base. The transmission members are sleeved on the pivot module. The panel bodies can pivot relative to the wing members and slide linearly relative to the transmission members. The synchronization module can drive the transmission members to reverse synchronously. The elastic module is sleeved on the pivot module. The flexible screen is disposed on the panel bodies and the wing members and includes a bendable area. When the panel bodies are in an unfolded state, the flexible screen is flattened. When the panel bodies are in a folded state, the bendable area is bent.

14 Claims, 13 Drawing Sheets

(56) References Cited

U.S. PATENT DOCUMENTS

| | | | | |
|---|---|---|---|---|
| 12,457,281 | B2* | 10/2025 | Huang | G06F 1/1652 |
| 2021/0303032 | A1* | 9/2021 | Hong | H04M 1/02 |
| 2021/0307181 | A1* | 9/2021 | Hong | G06F 1/1681 |
| 2021/0307185 | A1* | 9/2021 | Hong | G06F 1/1652 |
| 2023/0053947 | A1* | 2/2023 | Liu | G06F 1/1652 |
| 2023/0319173 | A1* | 10/2023 | Huang | H04M 1/0268 |
| | | | | 455/566 |
| 2023/0403347 | A1* | 12/2023 | Liu | H04M 1/18 |
| 2023/0421673 | A1* | 12/2023 | Huang | G06F 1/1616 |
| 2024/0036607 | A1* | 2/2024 | Yen | G06F 1/1652 |
| 2024/0080382 | A1* | 3/2024 | Huang | H04M 1/022 |
| 2024/0171663 | A1* | 5/2024 | Yen | H04M 1/0216 |
| 2024/0236216 | A1* | 7/2024 | Yen | G06F 1/1641 |
| 2025/0023966 | A1* | 1/2025 | Park | G06F 1/1616 |
| 2025/0080631 | A1* | 3/2025 | Su | G06F 1/1652 |
| 2025/0251760 | A1* | 8/2025 | Kim | H04M 1/0216 |

\* cited by examiner

FOLDABLE ELECTRONIC DEVICE

CROSS-REFERENCE TO RELATED APPLICATION

This application claims the benefit of Taiwan Patent Application Serial No. 112200180 filed on Jan. 6, 2023. The entirety of each Application is incorporated herein by reference.

BACKGROUND

1. Technical Field

The present disclosure relates to a foldable electronic device, and more particularly, to a foldable electronic device having a flexible screen.

2. Description of Related Art

Flexible screens have been widely used in smartphones and tablet computers. If the structure supporting the flexible screen is poorly designed, it may cause damage to the bendable area of the flexible screen when the flexible screen is folded, or the flexible screen cannot be fully flattened when it is unfolded. These situations might cause troubles to users. Although there are linkage structures that provide the accommodation space required for the bendable area, however, in order to form a large enough accommodation space, the corresponding moving distance of the internal components in the existing linkage structures is long, resulting in an increase in the overall thickness of the housing.

SUMMARY

The present disclosure provides a foldable electronic device, which comprises: a central base including a body portion, a lifting plate, at least one first inner arc-shaped slider and at least one second inner arc-shaped slider, wherein the first inner arc-shaped slider and the second inner arc-shaped slider are respectively formed on the body portion and spaced apart from each other, and wherein the lifting plate is movably disposed on the body portion and is able to transform between a highest position and a lowest position relatively; a pivot module disposed on the central base, wherein the pivot module includes a first rod and a second rod that are respectively and pivotally connected to the body portion and are able to reverse synchronously; a first wing member including at least one first inner arc-shaped slideway and at least one first outer arc-shaped slideway, wherein the first inner arc-shaped slider is slidably disposed on the first inner arc-shaped slideway, whereby the first wing member is able to pivot relative to the body portion with a first inner virtual axis as a center; a first transmission member sleeved on the first rod, wherein the first transmission member rotates synchronously with the first rod; a first panel body including a first carrying member which has at least one first outer arc-shaped slider, wherein the first carrying member is able to linearly slide relative to the first transmission member, and the first outer arc-shaped slider is slidably disposed on the first outer arc-shaped slideway, whereby the first carrying member is able to pivot relative to the first wing member about a first outer virtual axis; a second wing member including at least one second inner arc-shaped slideway and at least one second outer arc-shaped slideway, wherein the second inner arc-shaped slider is slidably disposed on the second inner arc-shaped slideway, whereby the second wing member is able to pivot relative to the body portion with a second inner virtual axis as a center; a second transmission member sleeved on the second rod, wherein the second transmission member rotates synchronously with the second rod; a second panel body including a second carrying member which has at least one second outer arc-shaped slider, wherein the second carrying member is able to linearly slide relative to the second transmission member, and the second outer arc-shaped slider is slidably disposed on the second outer arc-shaped slideway, whereby the second carrying member is able to pivot relative to the second wing member about a second outer virtual axis; a synchronization module including a synchronization slider body slidably disposed between the first transmission member and the second transmission member, wherein the first transmission member and the second transmission member are respectively connected to the synchronization slider body, and the synchronization slider body is able to drive the first transmission member and the second transmission member to rotate synchronously and reversely when the synchronization slider body slides; an elastic module including a pushing member, wherein the pushing member is slidably sleeved on the first rod and the second rod and is movably engaged with the first transmission member and the second transmission member; and a flexible screen disposed on the first panel body, the second panel body, the first wing member and the second wing member, and including a bendable area, wherein the first panel body and the second panel body are able to transform between an unfolded state and a folded state, wherein when the first panel body and the second panel body are in the unfolded state, the flexible screen is flattened, the lifting plate is positioned at the highest position, and the first wing member, the second wing member and the lifting plate jointly support the bendable area, wherein when the first panel body and the second panel body are in the folded state, the bendable area of the flexible screen bends, the lifting plate is positioned at the lowest position, and the first wing member, the second wing member and the lifting plate jointly define an accommodation space for accommodating the bendable area.

In the aforementioned foldable electronic device, the synchronization module further comprises a first helical protrusion, a second helical protrusion, a first helical groove and a second helical groove, wherein the first helical protrusion is matched with and accommodated in the first helical groove, and the second helical protrusion is matched with and accommodated in the second helical groove.

In the aforementioned foldable electronic device, the first transmission member comprises a first main driving cam, the second transmission member comprises a second main driving cam, and the pushing member has a first driven cam and a second driven cam, wherein the first main driving cam is slidably sleeved on the first rod along a first axis, moves together with the first rod, and cooperates with the first driven cam, and wherein the second main driving cam is slidably sleeved on the second rod along a second axis, moves together with the second rod, and cooperates with the second driven cam.

In the aforementioned foldable electronic device, the first helical protrusion is formed on a side surface of the first main driving cam, the second helical protrusion is formed on a side surface of the second main driving cam and corresponds to the first helical protrusion, the first helical groove and the second helical groove are recessed and formed on opposite two side surfaces of the synchronization slider body along a first helical direction and a second helical direction respectively.

In the aforementioned foldable electronic device, the first helical direction is opposite to the second helical direction.

In the aforementioned foldable electronic device, the first rod extends along the first axis, the first carrying member comprises a first straight sliding groove extending substantially perpendicular to the first axis, the first transmission member further comprises a first extension plate and a first straight slider, two sides of the first extension plate are connected to the first straight slider and the first main driving cam respectively, the first extension plate extends along a radial direction of the first axis, the first straight slider is formed by extending outward from the first extension plate along a direction parallel to the first axis and is slidably disposed in the first straight sliding groove, and wherein the second rod extends along the second axis, the second carrying member comprises a second straight sliding groove extending substantially perpendicular to the second axis, the second transmission member further comprises a second extension plate and a second straight slider, two sides of the second extension plate are connected to the second straight slider and the second main driving cam respectively, the second extension plate extends along a radial direction of the second axis, the second straight slider is formed by extending outward from the second extension plate along a direction parallel to the second axis and is slidably disposed in the second straight sliding groove.

In the aforementioned foldable electronic device, the first axis, the first inner virtual axis, the first outer virtual axis, the second axis, the second inner virtual axis and the second outer virtual axis are parallel to each other and do not overlap.

In the aforementioned foldable electronic device, the pivot module comprises a fixed base, a first shaft hole and a second shaft hole, and the fixed base has a first wing portion and a second wing portion, wherein the first shaft hole is formed through the first wing portion along the first axis, and the first rod passes through the first shaft hole, and wherein the second shaft hole is formed through the second wing portion along the second axis, and the second rod passes through the second shaft hole.

In the aforementioned foldable electronic device, the first driven cam is sleeved on the first rod, the second driven cam is sleeved on the second rod, the first main driving cam and the first driven cam are matched and engaged with each other, and the second main driving cam and the second driven cam are matched and engaged with each other, wherein the elastic module further comprises a first elastic member and a second elastic member sleeved on the first rod and the second rod respectively, two ends of the first elastic member abut against the first wing portion and the first driven cam respectively, two ends of the second elastic member abut against the second wing portion and the second driven cam respectively, wherein when the first panel body and the second panel body are in a semi-unfolded state between the unfolded state and the folded state, the first main driving cam and the second main driving cam abut against the first driven cam and the second driven cam, such that the first elastic member and the second elastic member are compressed, and wherein when the first carrying member and the second carrying member are in the unfolded state or the folded state, the first elastic member and the second elastic member are released correspondingly.

In the aforementioned foldable electronic device, the first elastic member and the second elastic member are respectively a compressive spring.

In the aforementioned foldable electronic device, the first wing member further comprises a first support plate, the second wing member further comprises a second support plate, and the body portion has an upper surface, wherein when the first panel body and the second panel body are in the unfolded state, the first support plate, the second support plate and the lifting plate are coplanar, and the lifting plate is spaced apart from the upper surface, and wherein when the first panel body and the second panel body are in the folded state, the lifting plate is in contact with the upper surface, the first support plate and the second support plate are respectively oblique to the body portion, and one end of the first support plate adjacent to the first carrying member and one end of the second support plate adjacent to the second carrying member are close to each other.

In the aforementioned foldable electronic device, the first wing member further comprises a first abutting portion adjacent to the first inner arc-shaped slideway and exposed from the first support plate, the second wing member further comprises a second abutting portion adjacent to the second inner arc-shaped slideway and exposed from the second support plate, and the central base further comprises a housing covering the body portion, wherein when the first panel body and the second panel body are in the unfolded state, the first abutting portion and the second abutting portion jointly abut against the lifting plate at the highest position, and wherein when the first panel body and the second panel body are in the folded state, the first abutting portion and the second abutting portion are away from the lifting plate and in contact with two opposite inner sides of the housing respectively.

In the aforementioned foldable electronic device, the central base further comprises a plurality of magnets embedded in the body portion, and the magnets constantly provide a magnetic force to the lifting plate to make the lifting plate tend to settle toward the lowest position, and wherein when the first panel body and the second panel body are in the folded state, the magnets attract the lifting plate to make the lifting plate settle and in contact with the upper surface.

In the aforementioned foldable electronic device, the flexible screen further comprises a first slightly bent area and a second slightly bent area, wherein the first slightly bent area is located correspondingly between the first carrying member and the first support plate, and the first outer virtual axis is located at a midpoint of the first slightly bent area in a thickness direction of the first slightly bent area, wherein the second slightly bent area is located correspondingly between the second carrying member and the second support plate, and the second outer virtual axis is located at a midpoint of the second slightly bent area in a thickness direction of the second slightly bent area, and wherein when the first panel body and the second panel body are in the folded state, compression and expansion of corresponding two sides of the first slightly bent area are the same as those of corresponding two sides of the second slightly bent area.

DETAILED DESCRIPTIONS

Figure 1:
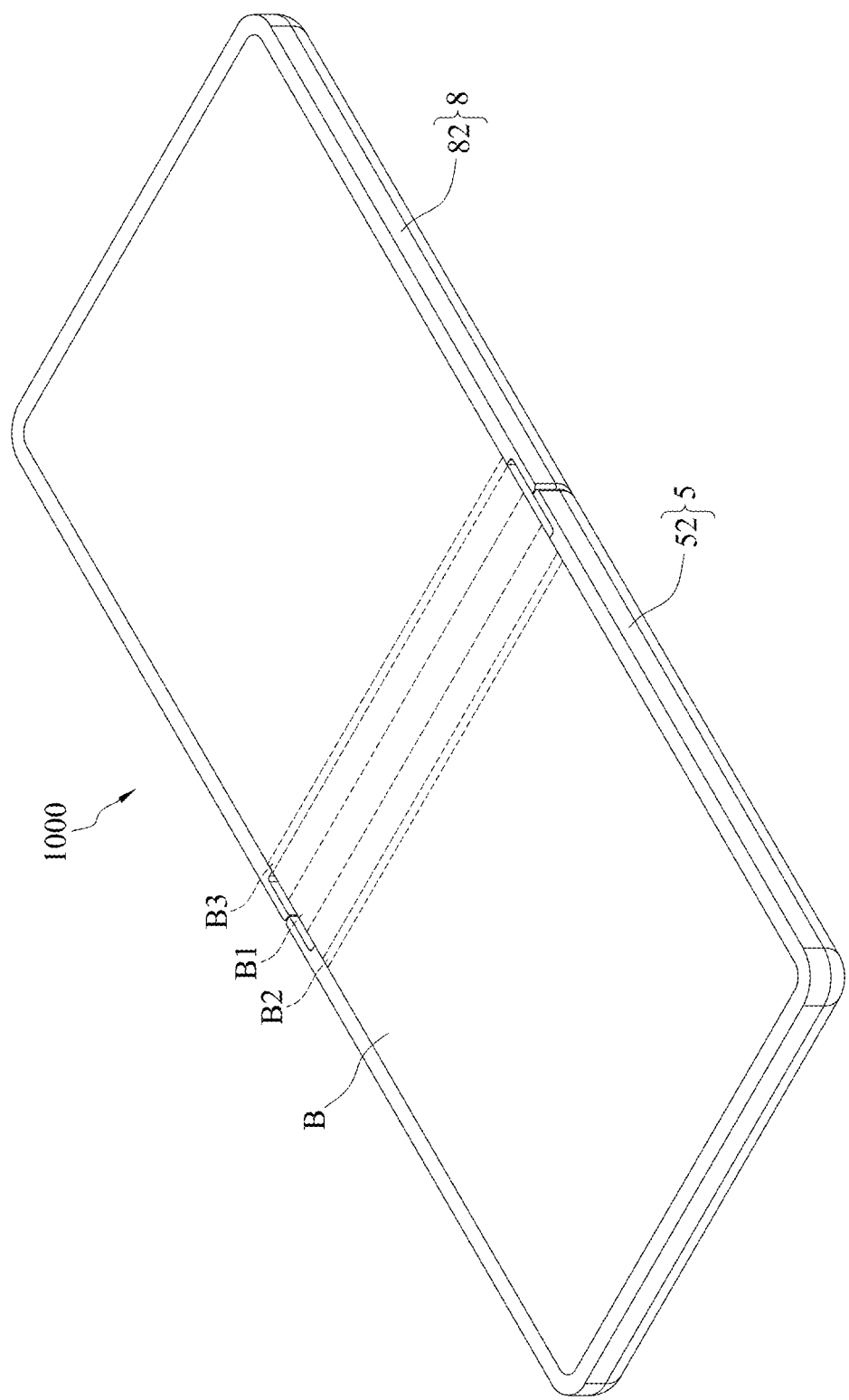
FIG. 1 is a schematic view of a foldable electronic device according to the present disclosure in an unfolded state.
Figure 2:
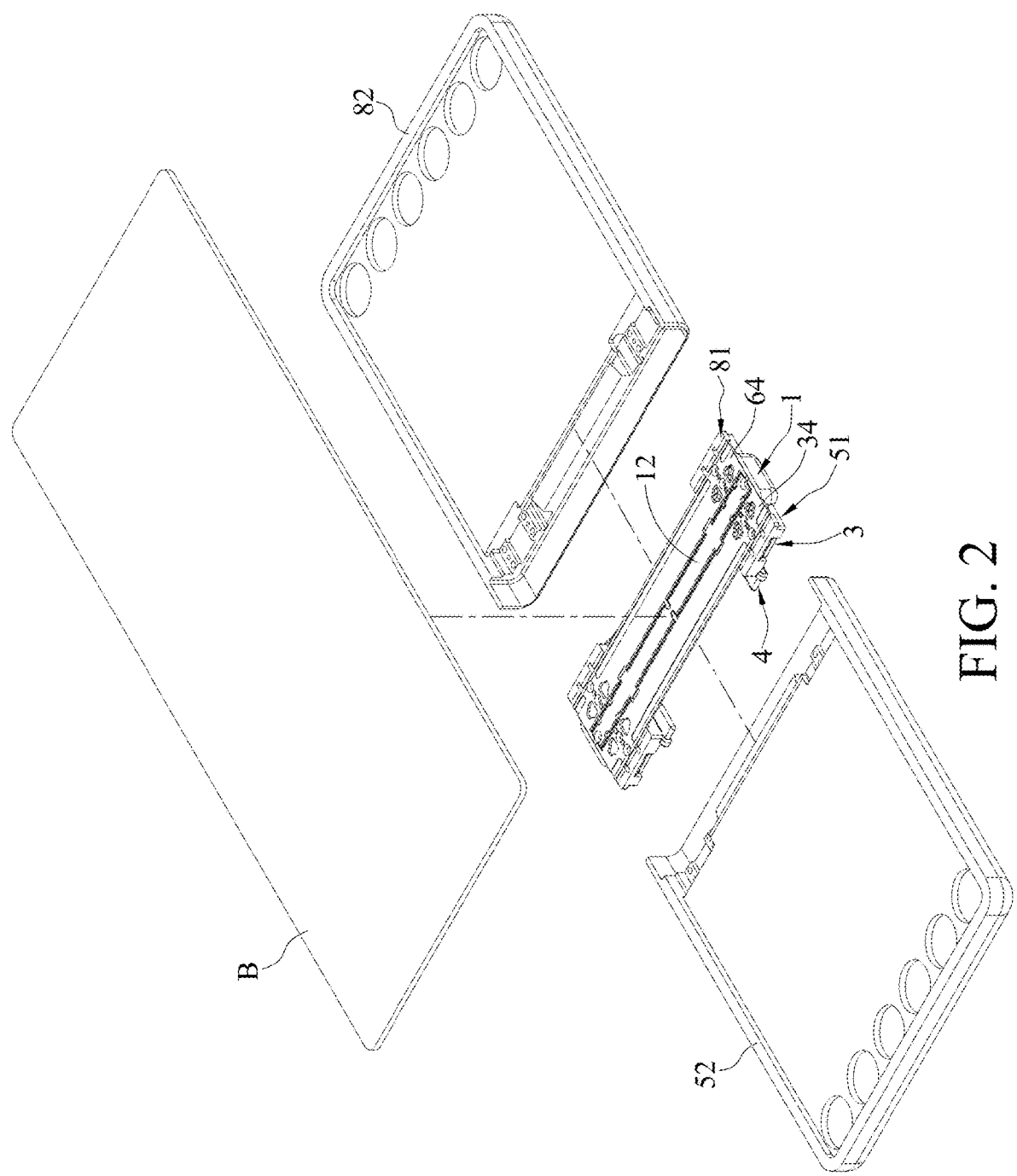
FIG. 2 is a schematic exploded view of the foldable electronic device according to the present disclosure in an unfolded state.
Figure 3:
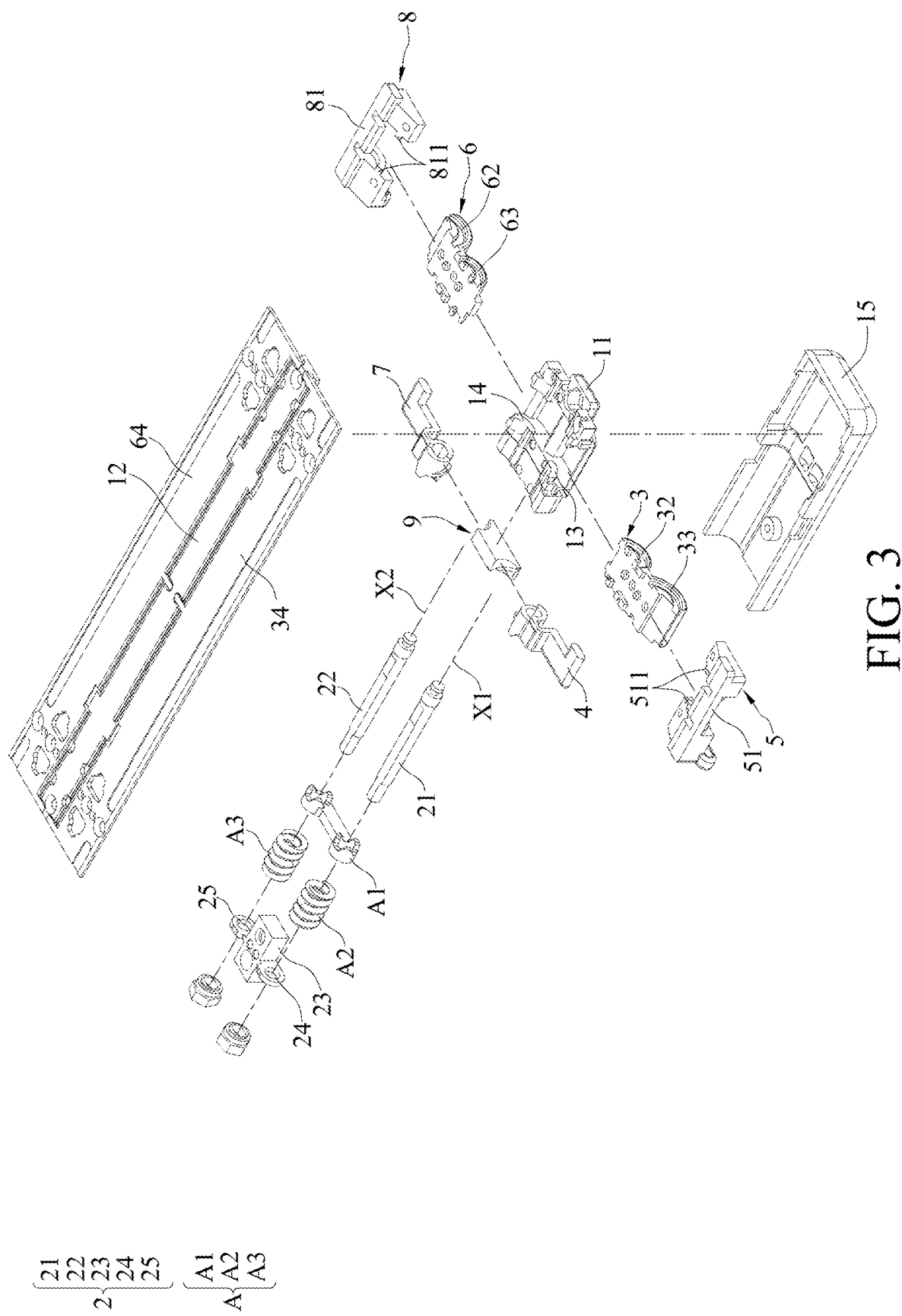
FIG. 3 is a schematic exploded view of some components of the foldable electronic device according to the present disclosure.

Please refer to FIG. 1, FIG. 2 and FIG. 3, a foldable electronic device 1000 according to the present disclosure comprises a central base 1, a pivot module 2, a first wing member 3, a first transmission member 4, a first panel body 5, a second wing member 6, a second transmission member 7, a second panel body 8, a synchronization module 9, an elastic module A, and a flexible screen B, wherein the pivot module 2 is disposed on the central base 1, the first wing member 3 is pivotally connected to the central base 1, the first transmission member 4 is connected to the pivot module 2, the first panel body 5 is connected to the first wing member 3, the second wing member 6 is pivotally connected to the central base 1, the second transmission member 7 is connected to the pivot module 2, the second panel body 8 is connected to the second wing member 6, the synchronization module 9 can be slidably disposed between the first transmission member 4 and the second transmission member 7, the elastic module A is connected to the pivot module 2, and the flexible screen B is disposed on the first wing member 3, the first panel body 5, the second wing member 6 and the second panel body 8. The structure of each component and the connection relationship between each other will be described in detail below, wherein part of the drawings are drawn with a first inner virtual axis VXI1, a second inner virtual axis VXI2, a first outer virtual axis VXO1, a second outer virtual axis VXO2, a first axis X1 and a second axis X2 that are parallel to each other and do not overlap. It should be noted that some components of the foldable electronic device 1000 of the present disclosure can be a group or a plurality of groups. However, whether it is one group or multiple groups, the action effects of the present disclosure can be achieved. The following is a simplified description, and only one group is used as an example.

Figure 4:
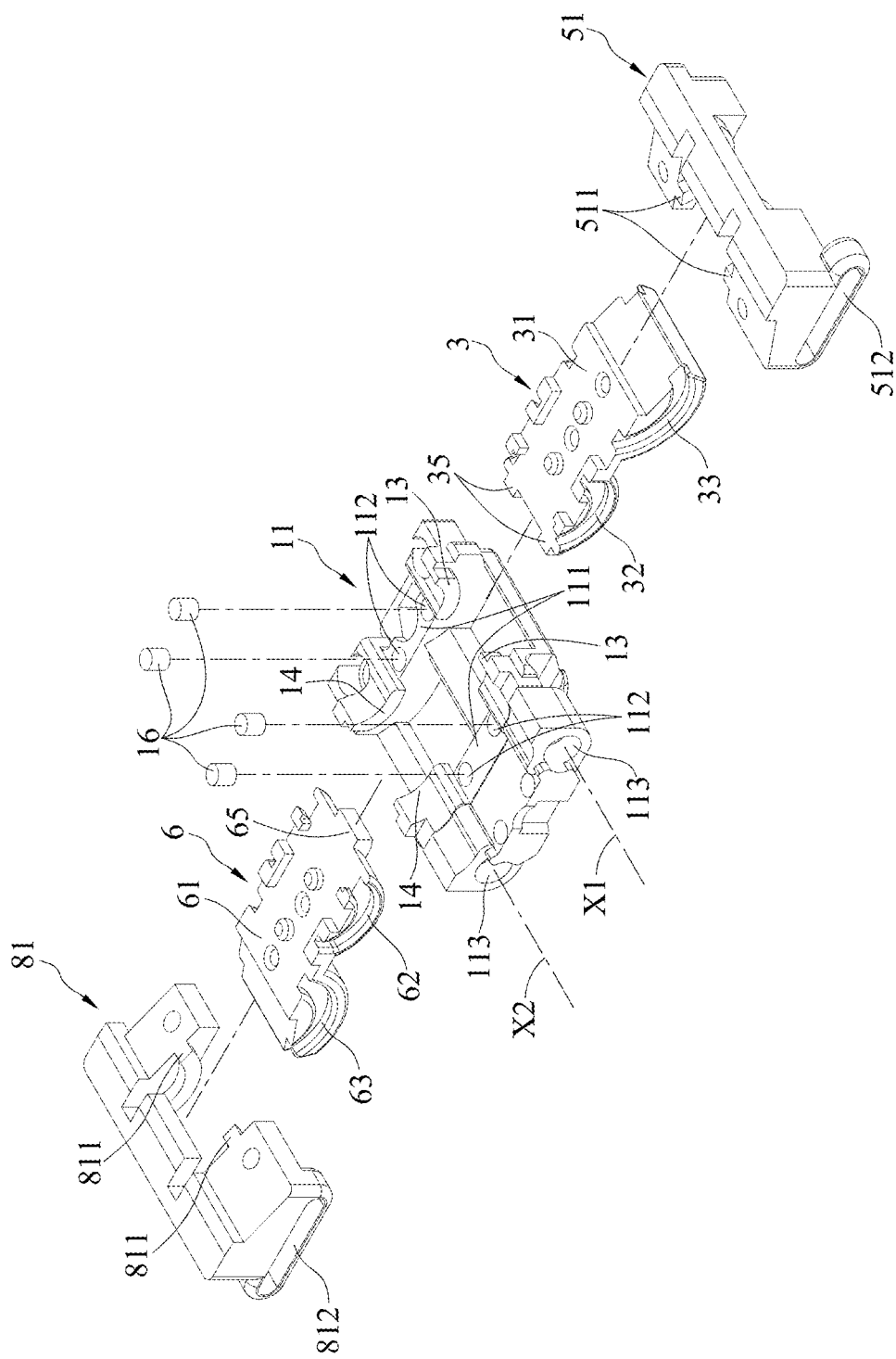
FIG. 4 is a schematic exploded view of different viewing angles of a central base, a first wing member, a first carrying member, a second wing member and a second carrying member of the foldable electronic device according to the present disclosure.
Figure 7:
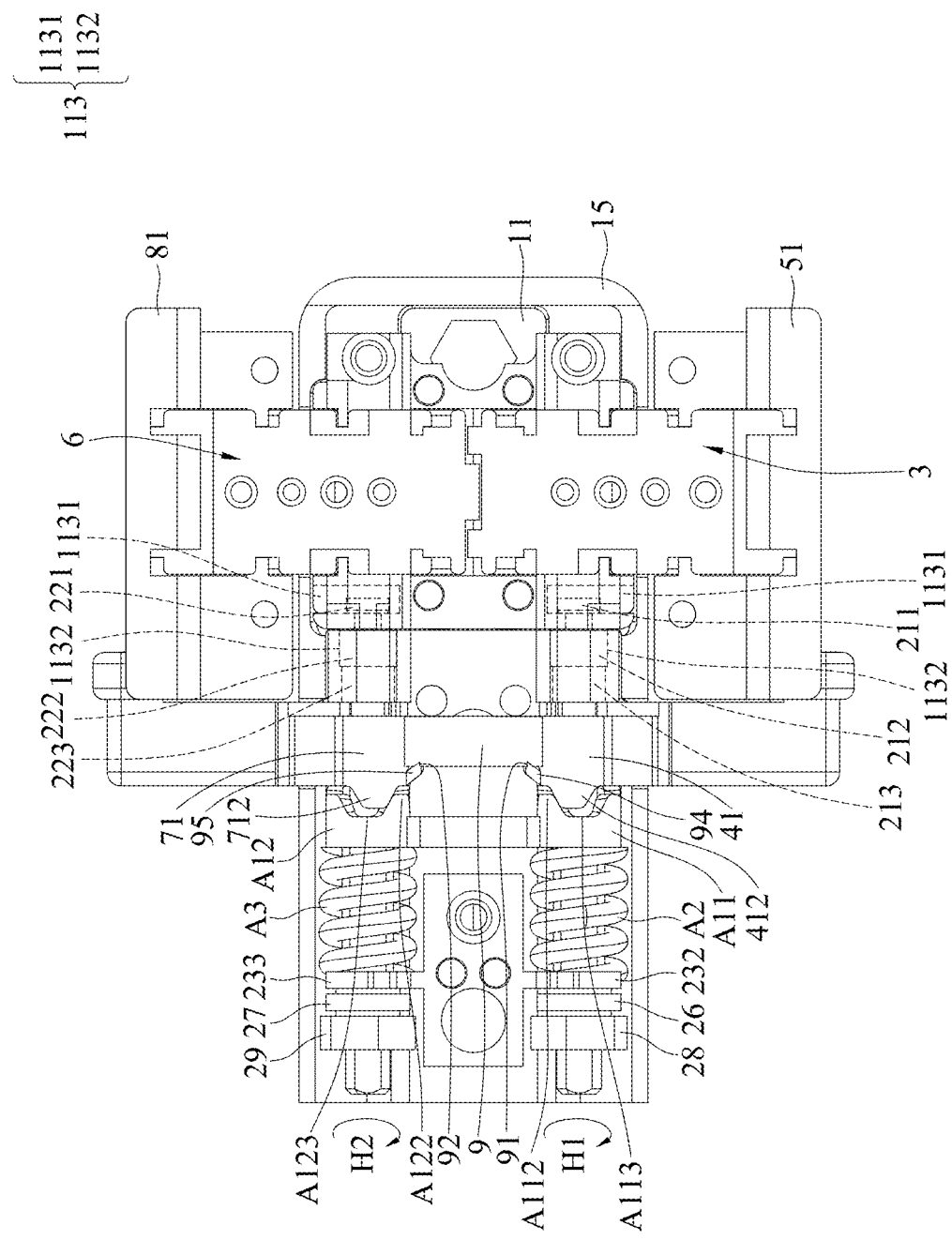
FIG. 7 is a schematic top view of some components of the foldable electronic device according to the present disclosure in an unfolded state.
Figure 8:
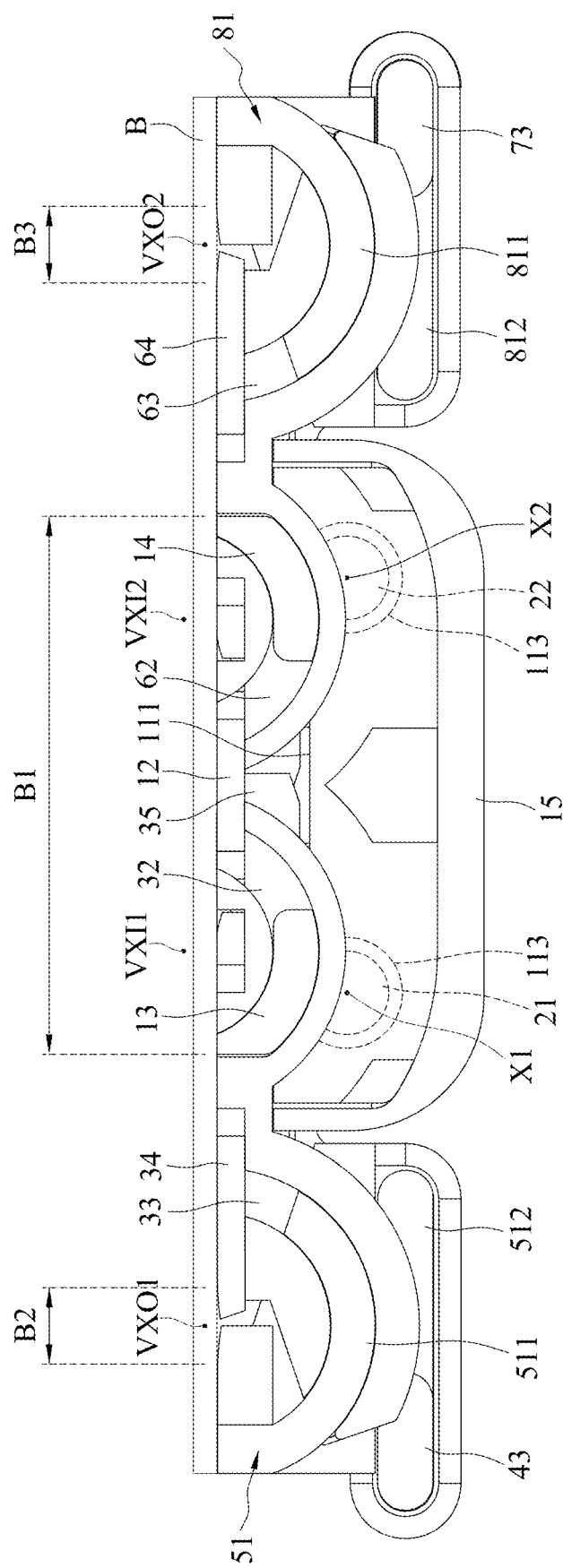
FIG. 8 is a schematic cross-sectional view of the foldable electronic device according to the present disclosure.
Figure 10:
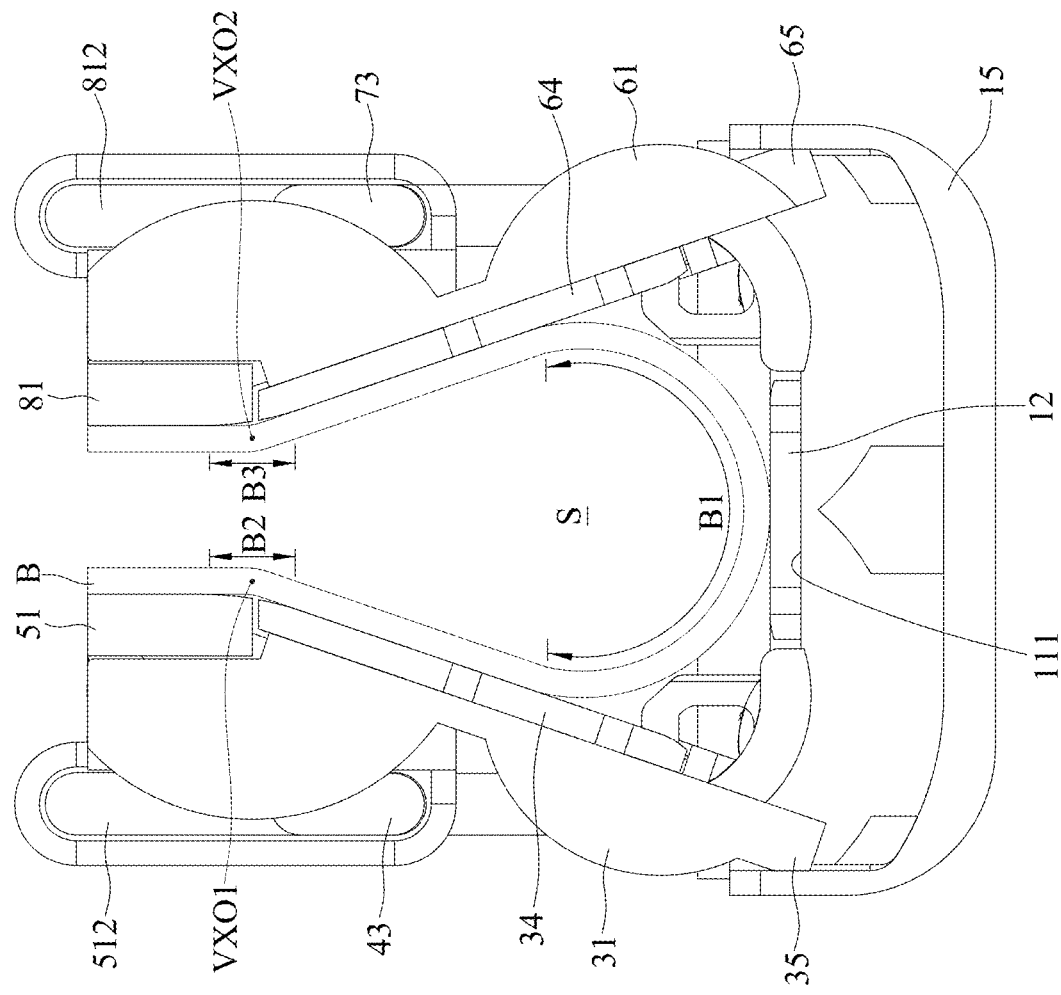
FIG. 10 is a schematic partial cross-sectional view of the foldable electronic device according to the present disclosure in a folded state.

Please refer to FIG. 4, FIG. 7 and FIG. 8 at the same time, the central base 1 includes a body portion 11, a lifting plate 12, two first inner arc-shaped sliders 13, two second inner arc-shaped sliders 14, a housing 15 and four magnets 16. The body portion 11 has an upper surface 111, four concave holes 112 and two shaft holes 113. The concave holes 112 are recessed and formed from the upper surface 111 and are spaced apart from each other. The shaft holes 113 are recessed and formed along the first axis X1 and the second axis X2 respectively, and respectively have an inner hole body 1131 and an outer hole body 1132 intercommunicated with each other. The lifting plate 12 is roughly rectangular, which can be movably disposed on the upper surface 111 of the body portion 11, and can be transformed between a highest position (as shown in FIG. 8) and a lowest position (as shown in FIG. 10) relatively. The first inner arc-shaped sliders 13 are roughly in a semi-arc shape, protruding from the body portion 11 opposite to each other and spaced apart, and adjacent to one side of the body portion 11 (i.e., adjacent to one side of the first panel body 5), and its axis can be defined as the first inner virtual axis VXI1. The second inner arc-shaped sliders 14 are roughly in a semi-arc shape, protruding from the body portion 11 opposite to each other and spaced apart, and adjacent to the other side of the body portion 11 (i.e., adjacent to one side of the second panel body 8), and are spaced apart from the first inner arc-shaped sliders 13, and its axis can be defined as the second inner virtual axis VXI2. The housing 15 covers the bottom side and two sides of the body portion 11. The magnets 16 are embedded in the concave holes 112 respectively and provide magnetic force to the lifting plate 12, so that the lifting plate 12 tends to settle toward the lowest position.

Figure 6:
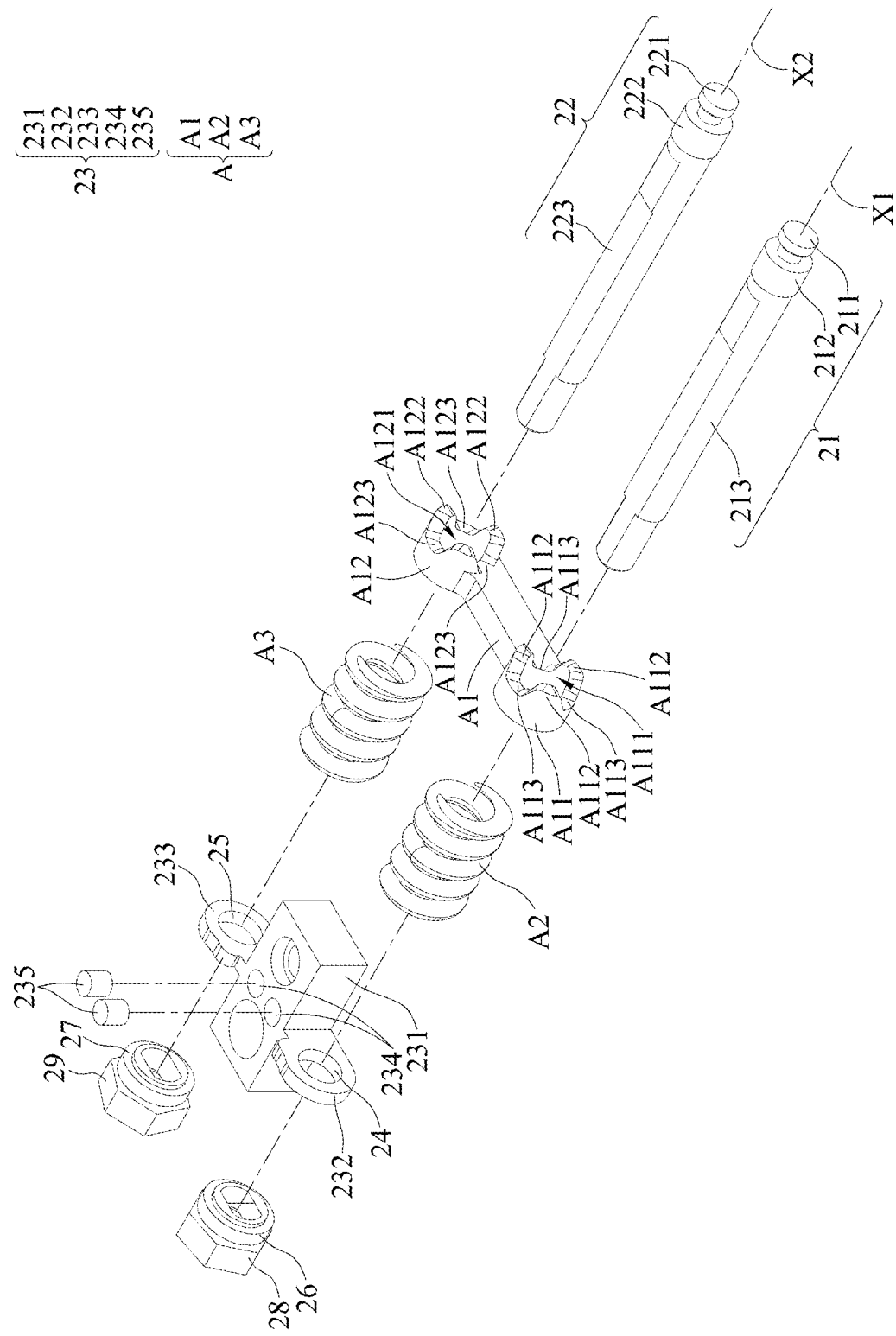
FIG. 6 is a schematic exploded view of a pivot module and an elastic module of the foldable electronic device according to the present disclosure.

Please refer to FIG. 6 at the same time, the pivot module 2 comprises a first rod 21, a second rod 22, a fixed base 23, a first shaft hole 24, a second shaft hole 25, a first washer 26, a second washer 27, a first nut 28 and a second nut 29. The first rod 21 extends along the first axis X1 and has a first rod head 211, a first limiting portion 212 and a first rod body 213. The first rod head 211 is accommodated in an inner hole body 1131 of one of the shaft holes 113. The first limiting portion 212 is connected to the first rod head 211 and is accommodated in an outer hole body 1132 of one of the shaft holes 113. The first rod body 213 extends outwardly from the first limiting portion 212 along the first axis X1, and the cross-sectional area of the first rod body 213, which is a non-circular cross-section, is smaller than the cross-sectional area of the first limiting portion 212. The second rod 22 extends along the second axis X2 and has a second rod head 221, a second limiting portion 222 and a second rod body 223. The second rod head 221 is accommodated in an inner hole body 1131 of the other one of the shaft holes 113. The second limiting portion 222 is connected to the second rod head 221 and is accommodated in an outer hole body 1132 of the other one of the shaft holes 113. The second rod body 223 extends outwardly from the second limiting portion 222 along the second axis X2, and the cross-sectional area of the second rod body 223, which is a non-circular cross-section, is smaller than the cross-sectional area of the second limiting portion 222.

The fixed base 23 has a base body 231, a first wing portion 232, a second wing portion 233, two concave holes 234 and two magnets 235. The base body 231 is roughly rectangular. The first wing portion 232 and the second wing portion 233 extend outwardly from opposite sides of the base body 231 and are spaced apart from each other. The concave holes 234 are recessed inwardly from the top surface of the base body 231 and are spaced apart from each other. The magnets 235 are embedded in the concave holes 234 respectively and provide magnetic force to the lifting plate 12, so that the lifting plate 12 tends to settle toward the lowest position. In other embodiments, the magnets 235 can also be omitted, and only the magnets 16 are used to provide the magnetic force.

The first shaft hole 24 is formed through the first wing portion 232 along the first axis X1, and is used for the first rod body 213 of the first rod 21 to pass through. The second shaft hole 25 is formed through the second wing portion 233 along the second axis X2, and is used for the second rod body 223 of the second rod 22 to pass through. The first washer 26 is sleeved on the first rod body 213 and abuts against the first wing portion 232. The second washer 27 is sleeved on the second rod body 223 and abuts against the second wing portion 233. The first nut 28 is screwed on the end of the first rod body 213 and abuts against the first washer 26. The second nut 29 is screwed on the end of the second rod body 223 and abuts against the second washer 27.

Please refer to FIG. 4 at the same time, the first wing member 3 comprises a first wing body 31, two first inner arc-shaped slideways 32, two first outer arc-shaped slideways 33, a first support plate 34 and two first abutting portions 35. The first wing body 31 is roughly rectangular. The first inner arc-shaped slideways 32 are recessed and formed on opposite sides of the first wing body 31 adjacent to the body portion 11 and spaced apart, and are respectively provided for sliding by the first inner arc-shaped sliders 13, such that the first wing member 3 can pivot relative to the body portion 11 with the first inner virtual axis VXI1 as the center. The first outer arc-shaped slideways 33 are recessed and formed on opposite sides of the first wing body 31 away from the body portion 11 and spaced apart, and are spaced apart from the first inner arc-shaped slideways 32, and its axis can be defined as the first outer virtual axis VXO1. The first support plate 34 is roughly rectangular, disposed on the top surface of the first wing body 31, and adjacent to one side of the two opposite sides of the lifting plate 12. The first abutting portion 35 is formed on one side of the first wing body 31 adjacent to the body portion 11, and is adjacent to the first inner arc-shaped slideway 32 and exposed from the first support plate 34.

Figure 5:
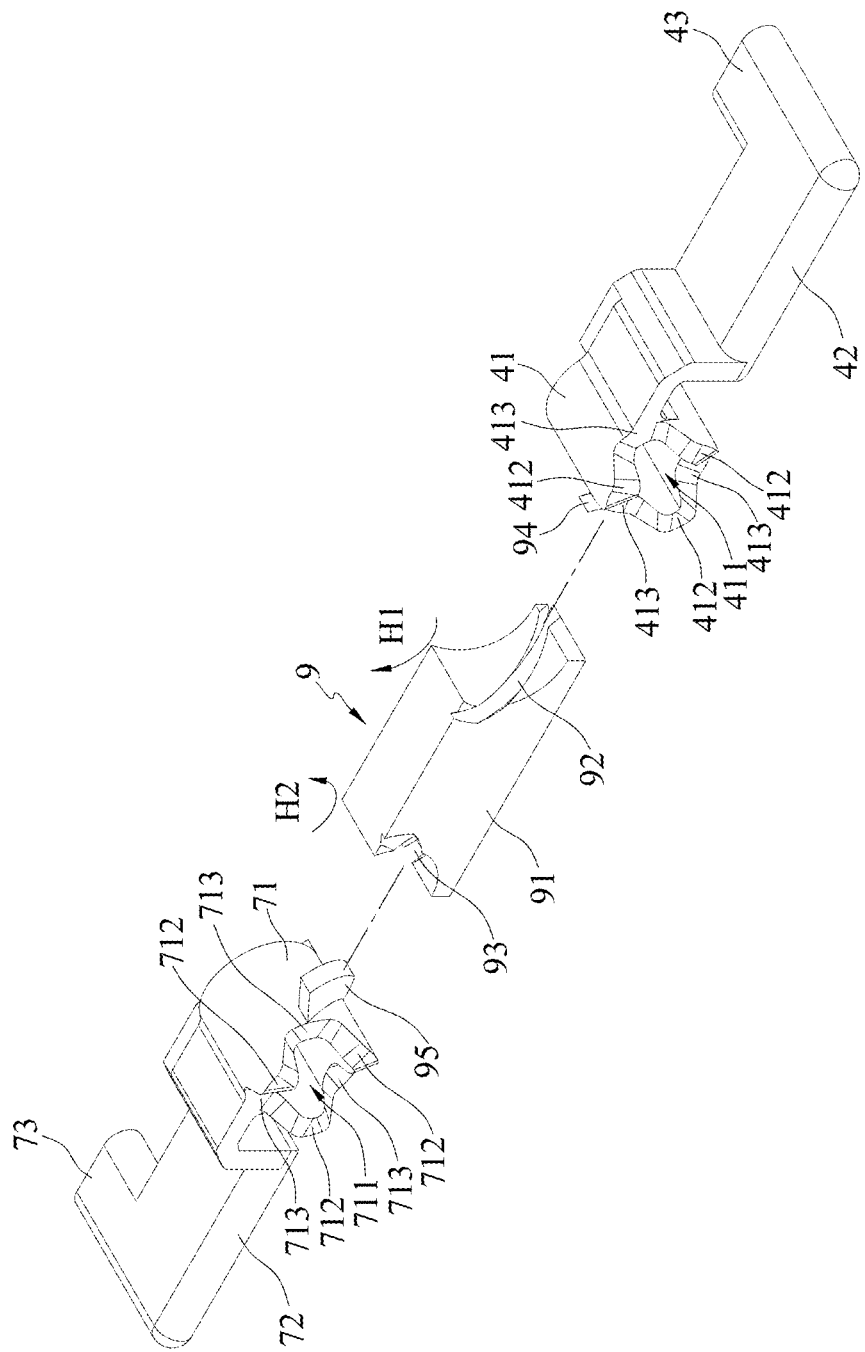
FIG. 5 is a schematic exploded view of different viewing angles of a first transmission member, a second transmission member and a synchronization module of the foldable electronic device according to the present disclosure.

Please refer to FIG. 5 and FIG. 7 at the same time, the first transmission member 4 is sleeved on the first rod 21 and comprises a first main driving cam 41, a first extension plate 42 and a first straight slider 43. The first main driving cam 41 is an end cam and has a first main penetrating hole 411, three first main convex portions 412 and three first main concave portions 413. The first main penetrating hole 411 is penetrated along the first axis X1, and is used for the first rod body 213 to pass through, and has a non-circular cross-section that matches the cross-section of the first rod body 213, such that the first main driving cam 41 can be slidably sleeved on the first rod 21 and move together with the first rod 21. The first main convex portions 412 extend outwardly along the first axis X1 and are spaced apart from each other. The first main concave portions 413 are formed respectively between any two first main convex portions 412 and are spaced apart from each other. The first extension plate 42 extends outwardly from the first main driving cam 41 along the radial direction of the first axis X1. The first straight slider 43 extends outwardly from the first extension plate 42 along the direction parallel to the first axis X1, that is, two sides of the first extension plate 42 are connected to the first main driving cam 41 and the first straight slider 43 respectively.

The first panel body 5 comprises a first carrying member 51 and a first panel housing 52, wherein the first carrying member 51 has two first outer arc-shaped sliders 511 and a first straight sliding groove 512, wherein the first outer arc-shaped sliders 511 are opposite to each other and spaced apart, and are slidably disposed on the first outer arc-shaped slideways 33 respectively, such that the first carrying member 51 can pivot relative to the first wing member 3 about the first outer virtual axis VXO1. The first straight sliding groove 512 extends perpendicularly to the first axis X1, and is provided for the first straight slider 43 to slide linearly therein. The first panel housing 52 is roughly in the shape of a square, fixed on the first carrying member 51 and coplanar with the first support plate 34. Moreover, the first panel body 5 further comprises related electronic components, but since they are relatively irrelevant to the folding action, thus will not be described in detail.

The second wing member 6 comprises a second wing body 61, two second inner arc-shaped slideways 62, two second outer arc-shaped slideways 63, a second support plate 64 and a second abutting portion 65. The second wing body 61 is roughly rectangular. The second inner arc-shaped slideways 62 are recessed and formed on opposite sides of the second wing body 61 adjacent to the body portion 11 and spaced apart, and are respectively provided for sliding by the second inner arc-shaped sliders 14, such that the second wing member 6 can pivot relative to the body portion 11 with the second inner virtual axis VXI2 as the center. The second outer arc-shaped slideways 63 are recessed and formed on opposite sides of the second wing body 61 away from the body portion 11 and spaced apart, and are spaced apart from the second inner arc-shaped slideways 62, and its axis can be defined as the second outer virtual axis VXO2. The second support plate 64 is roughly rectangular, disposed on the top surface of the second wing body 61, and adjacent to the other side of the two opposite sides of the lifting plate 12. The second abutting portion 65 is formed on one side of the second wing body 61 adjacent to the body portion 11, and is adjacent to the second inner arc-shaped slideway 62 and exposed from the second support plate 64 at the same time, and can be matched with the first abutting portion 35 (e.g., the second abutting portion 65 is located between the first abutting portions 35).

The second transmission member 7 is sleeved on the second rod 22 and comprises a second main driving cam 71, a second extension plate 72 and a second straight slider 73. The second main driving cam 71 is an end cam and has a second main penetrating hole 711, three second main convex portions 712 and three second main concave portions 713. The second main penetrating hole 711 is penetrated along the second axis X2, and is used for the second rod body 223 to pass through, and has a non-circular cross-section that matches the cross-section of the second rod body 223, such that the second main driving cam 71 can be slidably sleeved on the second rod 22 and move together with the second rod 22. The second main convex portions 712 extend outwardly along the second axis X2 and are spaced apart from each other. The second main concave portions 713 are formed respectively between any two second main convex portions 712 and are spaced apart from each other. The second extension plate 72 extends outwardly from the second main driving cam 71 along the radial direction of the second axis X2. The second straight slider 73 extends outwardly from the second extension plate 72 along the direction parallel to the second axis X2, that is, two sides of the second extension plate 72 are connected to the second main driving cam 71 and the second straight slider 73 respectively.

The second panel body 8 is opposite to the first panel body 5 and comprises a second carrying member 81 and a second panel housing 82, wherein the second carrying member 81 has two second outer arc-shaped sliders 811 and a second straight sliding groove 812, wherein the second outer arc-shaped sliders 811 are opposite to each other and spaced apart, and are slidably disposed on the second outer arc-shaped slideways 63 respectively, such that the second carrying member 81 can pivot relative to the second wing member 6 about the second outer virtual axis VXO2. The second straight sliding groove 812 extends perpendicularly to the second axis X2, and is provided for the second straight slider 73 to slide linearly therein. The second panel housing 82 is roughly in the shape of a square, fixed on the second carrying member 81 and coplanar with the second support plate 64. Similarly, the second panel body 8 further comprises related electronic components, but since they are relatively irrelevant to the folding action, thus will not be described in detail.

The synchronization module 9 includes a synchronization slider body 91, a first helical groove 92, a second helical groove 93, a first helical protrusion 94 and a second helical protrusion 95. The synchronization slider body 91 is disposed between the first transmission member 4 and the second transmission member 7, and is connected to the first transmission member 4 and the second transmission member 7. The first helical groove 92 is recessed and formed on one of two opposite side surfaces of the synchronization slider body 91 along a first helical direction H1. The second helical groove 93 is recessed and formed on the other one of two opposite side surfaces of the synchronization slider body 91 along a second helical direction H2. The first helical protrusion 94 is formed on the side surface of the first main driving cam 41 along the first helical direction H1 and is matched to be accommodated in the first helical groove 92. The second helical protrusion 95 is formed on the side surface of the second main driving cam 71 along the second helical direction H2 and is matched to be accommodated in the second helical groove 93. In an embodiment, the first helical direction H1 is opposite to the second helical direction H2. In other embodiments, the first helical groove 92 and the second helical groove 93 can also be recessed and formed on the side surfaces of the first main driving cam 41 and the second main driving cam 71 respectively, and the first helical protrusion 94 and the second helical protrusion 95 can also be formed on two opposite side surfaces of the synchronization slider body 91, and the present disclosure is not limited to as such.

The elastic module A comprises a pushing member A1, a first elastic member A2 and a second elastic member A3. The pushing member A1 can be slidably sleeved on the first rod 21 and the second rod 22 at the same time, and has a first driven cam A11 and a second driven cam A12 that are spaced apart from each other. The first driven cam A11 is an end cam and can be movably engaged and matched with the first main driving cam 41 (as shown in FIG. 7), and has a first sub penetrating hole A111, three first sub convex portions A112 and three first sub concave portions A113. The first sub penetrating hole A111 is penetrated along the first axis X1 and is used for the first rod body 213 to pass through, and the cross-sectional area of the first sub penetrating hole A111, which is a circular cross-section, is larger than the cross-sectional area of the first rod body 213, such that the first driven cam A11 can slide on the first rod 21 along the first axis X1 but not move together. The first sub convex portions A112 extend outwardly along the first axis X1 and are spaced apart from each other. The first sub concave portions A113 are formed between any two of the first sub convex portions A112 respectively and spaced apart from each other. The second driven cam A12 is an end cam and can be movably engaged and matched with the second main driving cam 71 (as shown in FIG. 7), and has a second sub penetrating hole A121, three second sub convex portions A122 and three second sub concave portions A123. The second sub penetrating hole A121 is penetrated along the second axis X2 and is used for the second rod body 223 to pass through, and the cross-sectional area of the second sub penetrating hole A121, which is a circular cross-section, is larger than the cross-sectional area of the second rod body 223, such that the second driven cam A12 can slide on the second rod 22 along the second axis X2 but not move together. The second sub convex portions A122 extend outwardly along the second axis X2 and are spaced apart from each other. The second sub concave portions A123 are formed between any two of the second sub convex portions A122 respectively and spaced apart from each other. The first elastic member A2 is sleeved on the first rod body 213, and two ends of the first elastic member A2 abut against the first wing portion 232 and the first driven cam A11 respectively. The second elastic member A3 is sleeved on the second rod body 223, and two ends of the second elastic member A3 abut against the second wing portion 233 and the second driven cam A12 respectively. In an embodiment, the first elastic member A2 and the second elastic member A3 are respectively a compressive spring.

The flexible screen B is disposed on the first panel body 5, the second panel body 8, the first wing member 3 and the second wing member 6, and comprises a bendable area B1, a first slightly bent area B2 and a second slightly bent area B3. The bendable area B1 roughly corresponds to the lifting plate 12, the first support plate 34 and the second support plate 64. The first slightly bent area B2 roughly corresponds to the intersection between the first carrying member 51 and the first support plate 34, and the first outer virtual axis VXO1 is located at the midpoint of the first slightly bent area B2 in the thickness direction of the first slightly bent area B2. The second slightly bent area B3 roughly corresponds to the intersection between the second carrying member 81 and the second support plate 64, and the second outer virtual axis VXO2 is located at the midpoint of the second slightly bent area B3 in the thickness direction of the second slightly bent area B3.

Figure 9:
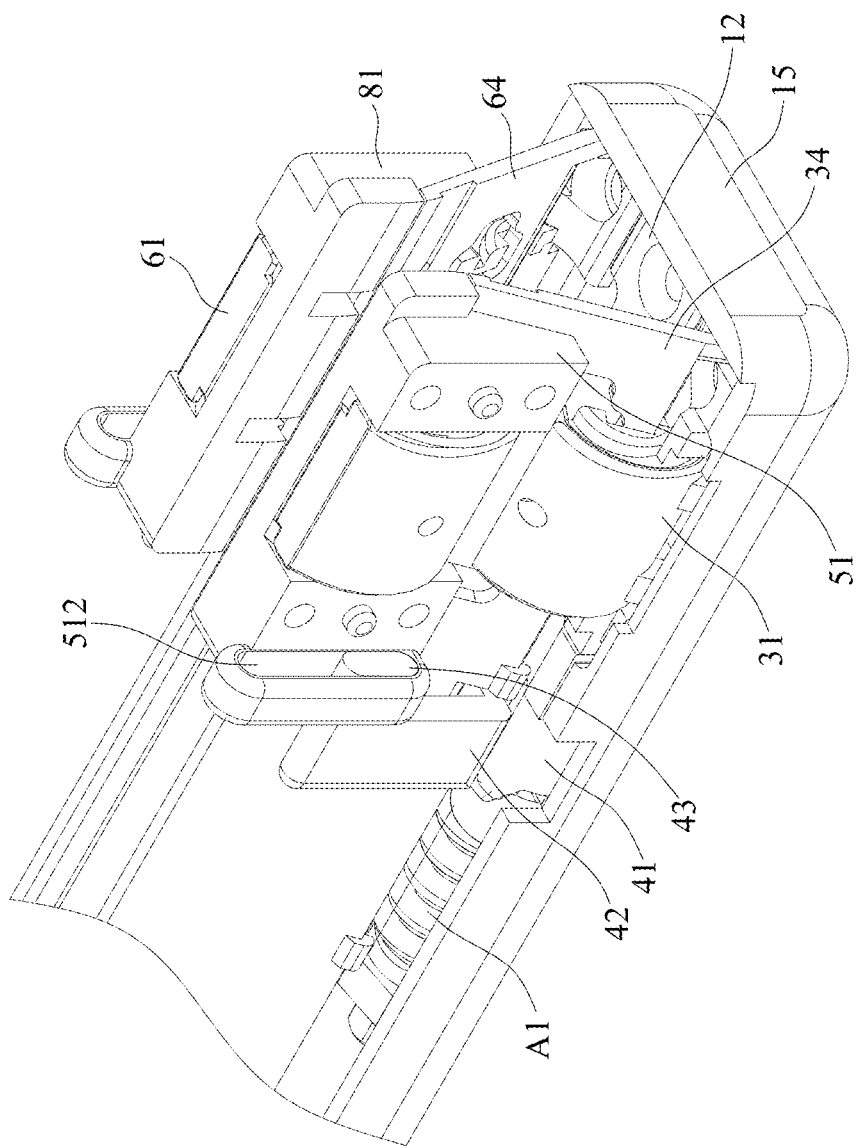
FIG. 9 is a schematic partial view of the foldable electronic device according to the present disclosure in a folded state.

The actuation of the foldable electronic device 1000 of the present disclosure is described below. The first panel body 5 and the second panel body 8 can be transformed between an unfolded state (as shown in FIG. 1, FIG. 2 and FIG. 8) and a folded state (as shown in FIG. 9 and FIG. 10). When the first panel body 5 and the second panel body 8 are in the unfolded state, the flexible screen B is flattened, wherein the first support plate 34, the second support plate 64 and the lifting plate 12 are coplanar and jointly support the bendable area B1, wherein the lifting plate 12 is spaced apart from the upper surface 111, and the first abutting portion 35 and the second abutting portion 65 jointly abut against the lifting plate 12 at the highest position, as shown in FIG. 7. At this time, the first main driving cam 41 and the first driven cam A11 are matched and engaged with each other, that is, each of the first main convex portions 412 extends into each of the first sub concave portions A113, and one side surface of each of the first main convex portions 412 is partially in contact with one side surface of each of the first sub convex portions A112, so that friction is generated, and the sum of the lengths of the first main driving cam 41 and the first driven cam A11 on the first axis X1 is the smallest. The second main driving cam 71 and the second driven cam A12 are matched and engaged with each other, that is, each of the second main convex portions 712 extends into each of the second sub concave portions A123, and one side surface of each of the second main convex portions 712 is partially in contact with one side surface of each of the second sub convex portions A122, so that friction is generated, and the sum of the lengths of the second main driving cam 71 and the second driven cam A12 on the second axis X2 is the smallest, and the first elastic member A2 and the second elastic member A3 are released correspondingly (in other words, the compression is at the minimum).

When the first panel body 5 and the second panel body 8 are transformed from the unfolded state to the folded state, the first wing member 3 and the second wing member 6 pivot relative to the body portion 11 with the first inner virtual axis VXI1 and the second inner virtual axis VXI2 as the center respectively and approach each other gradually (i.e., a state where the first support plate 34, the second support plate 64 and the lifting plate 12 are coplanar is gradually changed to a state where the first support plate 34 and the second support plate 64 are respectively oblique to the lifting plate 12). At this time, the first carrying member 51 and the second carrying member 81 also pivot and move relative to the first wing member 3 and the second wing member 6 with the first outer virtual axis VXO1 and the second outer virtual axis VXO2 as the center respectively, and the first straight slider 43 and the second straight slider 73 slide linearly in the first straight sliding groove 512 and the second straight sliding groove 812 respectively (slide from one end of the sliding groove to the other end), and at the same time, the first extension plate 42 and the first main driving cam 41 are pivoted with the first axis X1 as the center, and the second extension plate 72 and the second main driving cam 71 are pivoted with the second axis X2 as the center. Since the first helical direction H1 of the first helical groove 92 and the second helical direction H2 of the second helical groove 93 on the opposite two side surfaces of the synchronization slider body 91 are opposite, the first helical protrusion 94 and the second helical protrusion 95 also slide along the first helical groove 92 and the second helical groove 93 respectively. When the first main driving cam 41 and the first rod 21 move together and the second main driving cam 71 and the second rod 22 move together, the first rod 21 and the second rod 22 are driven to rotate synchronously and reversely.

Figure 11:
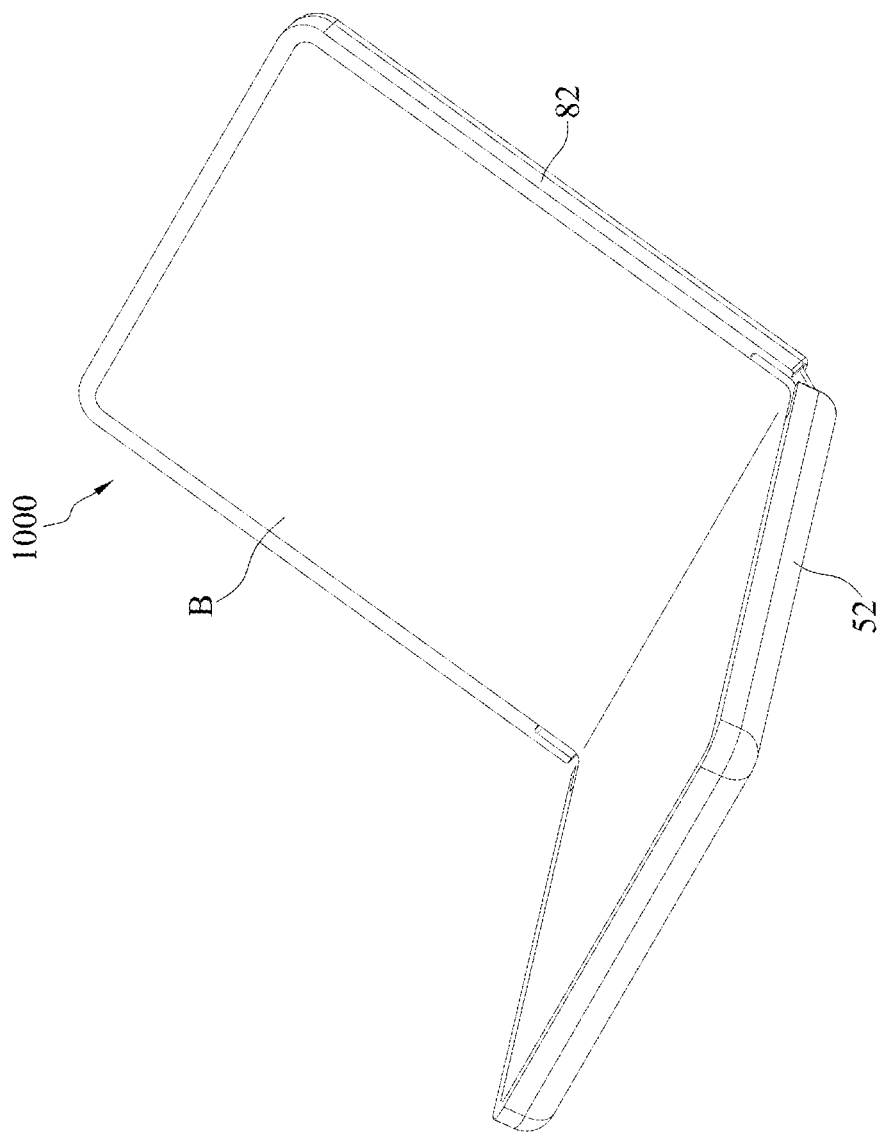
FIG. 11 is a schematic front view of the foldable electronic device according to the present disclosure in a semi-unfolded state.
Figure 12:
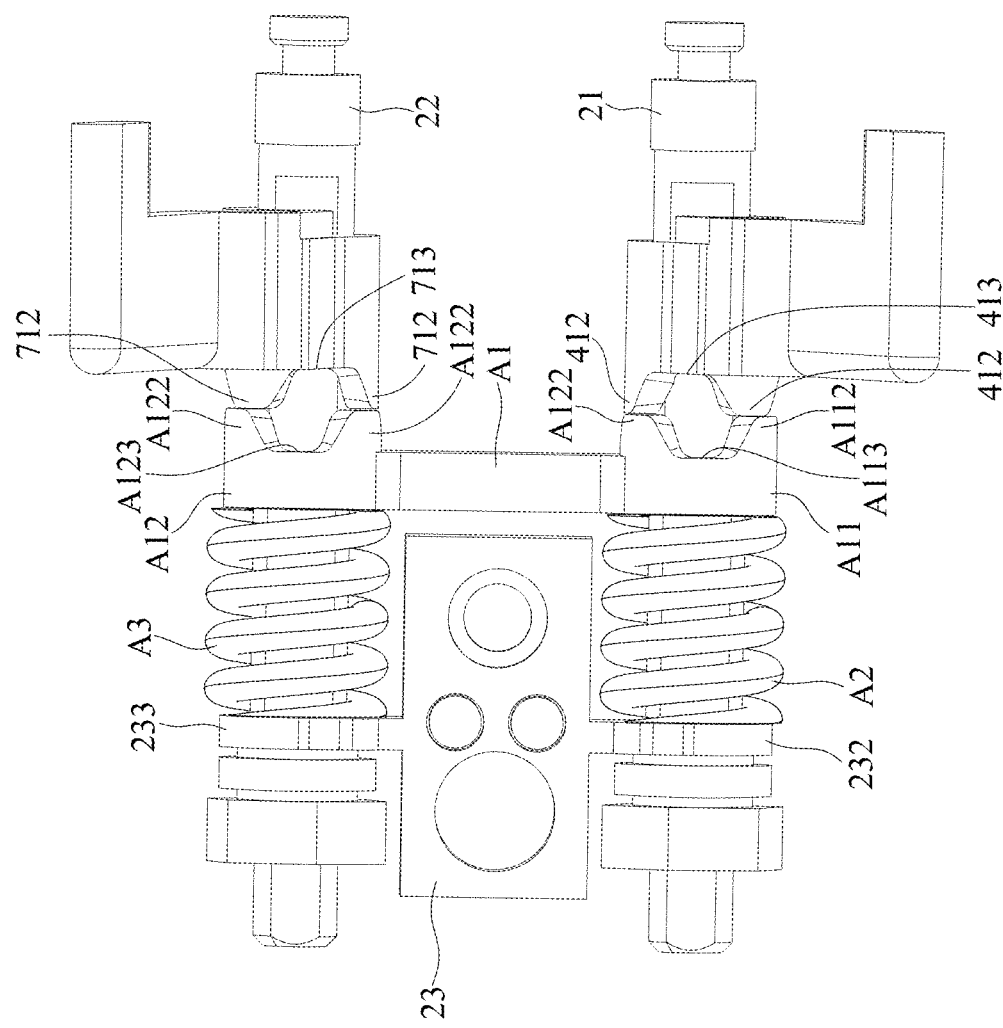
FIG. 12 is a schematic top view of some components of the foldable electronic device according to the present disclosure in a semi-unfolded state.

When the first panel body 5 and the second panel body 8 are transformed from the unfolded state to the folded state, the first main driving cam 41 gradually pushes the first driven cam A11 and the second main driving cam 71 gradually pushes the second driven cam A12, such that the first elastic member A2 and the second elastic member A3 are gradually compressed (the compression is gradually increased). When the first panel body 5 and the second panel body 8 are transformed to a semi-unfolded state between the unfolded state and the folded state, as shown in FIG. 11 and FIG. 12 (only the pivot module 2, the first transmission member 4, the second transmission member 7 and the elastic module A are shown for convenience of illustration), the first main driving cam 41 and the second main driving cam 71 form an opposing state with the first driven cam A11 and the second driven cam A12 respectively, that is, each of the first main convex portions 412 respectively abuts against each of the first sub convex portions A112, each of the first main concave portions 413 respectively corresponds to each of the first sub concave portions A113, each of the second main convex portions 712 respectively abuts against each of the second sub convex portions A122, each of the second main concave portions 713 respectively corresponds to each of the second sub concave portions A123, the pushing member A1 moves toward the fixed base 23 along the first rod 21 and the second rod 22, such that the first elastic member A2 and the second elastic member A3 are compressed (in other words, the compression is at the maximum). At this time, the sum of the lengths of the first main driving cam 41 and the first driven cam A11 on the first axis X1 is the largest, and the sum of the lengths of the second main driving cam 71 and the second driven cam A12 on the second axis X2 is the largest. In an embodiment, the semi-unfolded state generally means that the first panel body 5 and the second panel body 8 sandwich an angle between 30 degrees to 150 degrees, but the present disclosure is not limited to as such.

Figure 13:
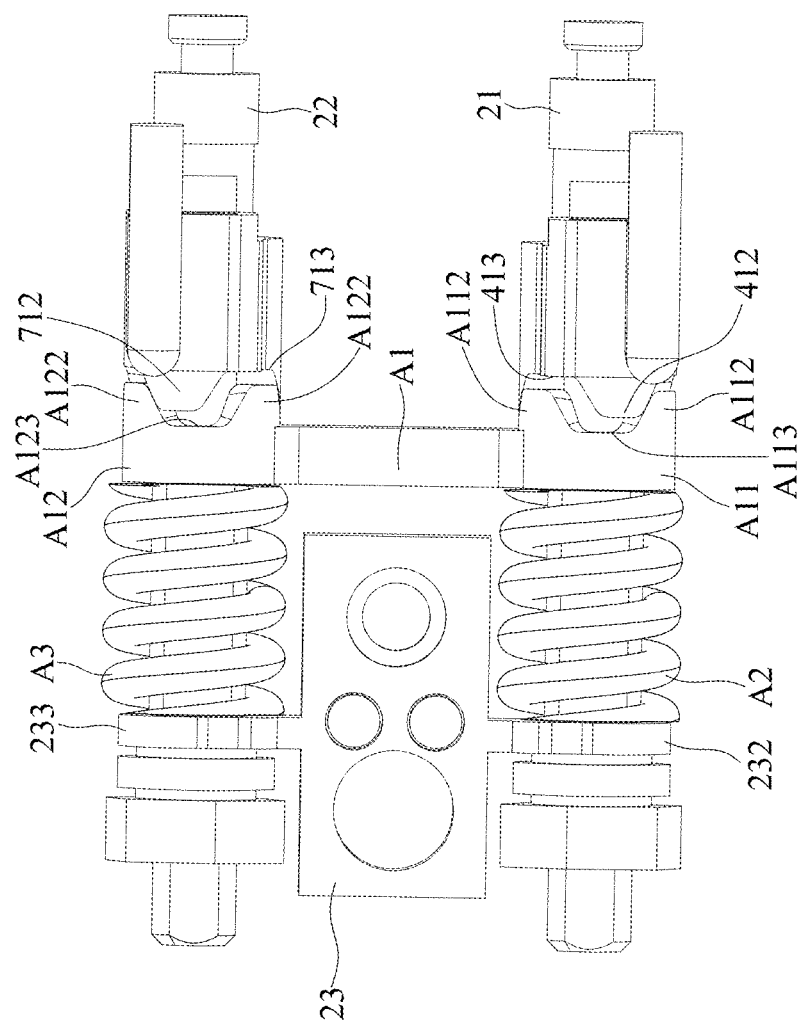
FIG. 13 is a schematic top view of some components of the foldable electronic device according to the present disclosure in a folded state.

When the operation continues to transform the first panel body 5 and the second panel body 8 toward the folded state, as shown in FIG. 13 (only the pivot module 2, the first transmission member 4, the second transmission member 7 and the elastic module A are shown for convenience of illustration), the first main driving cam 41 and the first driven cam A11 will again gradually be matched and engaged with each other, that is, each of the first main convex portions 412 gradually and deeply enters again into each of the first sub concave portions A113 respectively, and each of the side surface of the first main convex portions 412 is partially in contact with each of the side surface of the first sub convex portions A112 respectively (the other sides are in contact with each other), so that friction is generated. The second main driving cam 71 and the second driven cam A12 also will be gradually matched and engaged with each other, that is, each of the second main convex portions 712 gradually and deeply enters again into each of the second sub concave portions A123 respectively, and each of the side surface of the second main convex portions 712 is partially in contact with each of the side surface of the second sub convex portions A122 respectively (the other sides are in contact with each other), so that friction is generated, causing the first elastic member A2 and the second elastic member A3 to be gradually released (in other words, the compression is gradually decreased). When the first panel body 5 and the second panel body 8 are transformed to the folded state, the sum of the lengths of the first main driving cam 41 and the first driven cam A11 on the first axis X1 is the smallest, and the sum of the lengths of the second main driving cam 71 and the second driven cam A12 on the second axis X2 is the smallest, the first elastic member A2 and the second elastic member A3 are released (in other words, the compression is at the minimum), the first abutting portion 35 and the second abutting portion 65 are not abutted against the lifting plate 12 and are in contact with two opposite inner sides of the housing 15 respectively, and the lifting plate 12 loses the support, so that the lifting plate 12 is magnetically attracted by the magnets 16 and settles to the lowest position, and is in contact with the upper surface 111. At this time, the first support plate 34 and the second support plate 64 are respectively oblique to the body portion 11, and one end of the first support plate 34 adjacent to the first carrying member 51 and one end of the second support plate 64 adjacent to the second carrying member 81 are close to each other. The bendable area B1 of the flexible screen B bends, and the first wing member 3, the second wing member 6 and the lifting plate 12 jointly define an accommodation space S for accommodating the bendable area B1. In other words, the lifting plate 12, the first support plate 34 and the second support plate 64 can be roughly in the shape of a triangle, so that the bendable area B1 can be partially attached to the lifting plate 12, the first support plate 34 and the second support plate 64 and is roughly semicircular. At the same time, the first slightly bent area B2 and the second slightly bent area B3 of the flexible screen B are also slightly bent, and since the first outer virtual axis VXO1 and the second outer virtual axis VXO2 are located at the midpoints of the first slightly bent area B2 and the second slightly bent area B3 in the thickness direction of the first slightly bent area B2 and the second slightly bent area B3 respectively, the amount of compression (the side adjacent to the first wing member 3 and the first carrying member 51) and the amount of expansion (the side away from the first wing member 3 and the first carrying member 51) of the corresponding two sides of the first slightly bent area B2 are the same, and the amount of compression (the side adjacent to the second wing member 6 and the second carrying member 81) and the amount of expansion (the side away from the second wing member 6 and the second carrying member 81) of the corresponding two sides of the second slightly bent area B3 are also the same, and the bendable area B1, the first slightly bent area B2 and the second slightly bent area B3 are roughly in the shape of a water drop.

In summary, in the foldable electronic device of the present disclosure, the first wing member and the second wing member can pivot relative to the central base, wherein the first carrying member and the second carrying member can pivot relative to the first wing member and the second wing member respectively, and drive the first transmission member and the second transmission member to slide linearly relative to the first carrying member and the second carrying member respectively, so as to let the first rod and the second rod reverse synchronously, so that the lifting plate, the first wing member and the second wing member jointly support the bendable area of the flexible screen when the first panel body and the second panel body are in the unfolded state, and the lifting plate settles and forms an accommodation space together with the first wing member and the second wing member when the first panel body and the second panel body are in the folded state, thereby effectively creating a large enough accommodation space enough to accommodate the bendable area without increasing the overall thickness.

What is claimed is:

1. A foldable electronic device, comprising:
   a central base including a body portion, a lifting plate, at least one first inner arc-shaped slider and at least one second inner arc-shaped slider, wherein the first inner arc-shaped slider and the second inner arc-shaped slider are respectively formed on the body portion and spaced apart from each other, and wherein the lifting plate is movably disposed on the body portion and is able to transform between a highest position and a lowest position relatively;
   a pivot module disposed on the central base, wherein the pivot module includes a first rod and a second rod that are respectively and pivotally connected to the body portion and are able to reverse synchronously;
   a first wing member including at least one first inner arc-shaped slideway and at least one first outer arc-shaped slideway, wherein the first inner arc-shaped slider is slidably disposed on the first inner arc-shaped slideway, whereby the first wing member is able to pivot relative to the body portion with a first inner virtual axis as a center;
   a first transmission member sleeved on the first rod, wherein the first transmission member rotates synchronously with the first rod;
   a first panel body including a first carrying member which has at least one first outer arc-shaped slider, wherein the first carrying member is able to linearly slide relative to the first transmission member, and the first outer arc-shaped slider is slidably disposed on the first outer arc-shaped slideway, whereby the first carrying member is able to pivot relative to the first wing member about a first outer virtual axis;
   a second wing member including at least one second inner arc-shaped slideway and at least one second outer arc-shaped slideway, wherein the second inner arc-shaped slider is slidably disposed on the second inner arc-shaped slideway, whereby the second wing member is able to pivot relative to the body portion with a second inner virtual axis as a center;
   a second transmission member sleeved on the second rod, wherein the second transmission member rotates synchronously with the second rod;
   a second panel body including a second carrying member which has at least one second outer arc-shaped slider, wherein the second carrying member is able to linearly slide relative to the second transmission member, and the second outer arc-shaped slider is slidably disposed on the second outer arc-shaped slideway, whereby the second carrying member is able to pivot relative to the second wing member about a second outer virtual axis;
   a synchronization module including a synchronization slider body slidably disposed between the first transmission member and the second transmission member, wherein the first transmission member and the second transmission member are respectively connected to the synchronization slider body, and the synchronization slider body is able to drive the first transmission member and the second transmission member to rotate synchronously and reversely when the synchronization slider body slides;
   an elastic module including a pushing member, wherein the pushing member is slidably sleeved on the first rod and the second rod and is movably engaged with the first transmission member and the second transmission member; and
   a flexible screen disposed on the first panel body, the second panel body, the first wing member and the second wing member, and including a bendable area, wherein the first panel body and the second panel body are able to transform between an unfolded state and a folded state, wherein when the first panel body and the second panel body are in the unfolded state, the flexible screen is flattened, the lifting plate is positioned at the highest position, and the first wing member, the second wing member and the lifting plate jointly support the bendable area, and wherein when the first panel body and the second panel body are in the folded state, the bendable area of the flexible screen bends, the lifting plate is positioned at the lowest position, and the first wing member, the second wing member and the lifting plate jointly define an accommodation space for accommodating the bendable area.

2. The foldable electronic device of claim 1, wherein the synchronization module further comprises a first helical protrusion, a second helical protrusion, a first helical groove and a second helical groove, wherein the first helical protrusion is matched with and accommodated in the first helical groove, and the second helical protrusion is matched with and accommodated in the second helical groove.

3. The foldable electronic device of claim 2, wherein the first transmission member comprises a first main driving cam, the second transmission member comprises a second main driving cam, and the pushing member has a first driven cam and a second driven cam, wherein the first main driving cam is slidably sleeved on the first rod along a first axis, moves together with the first rod, and cooperates with the first driven cam, and wherein the second main driving cam is slidably sleeved on the second rod along a second axis, moves together with the second rod, and cooperates with the second driven cam.

4. The foldable electronic device of claim 3, wherein the first helical protrusion is formed on a side surface of the first main driving cam, the second helical protrusion is formed on a side surface of the second main driving cam and corresponds to the first helical protrusion, the first helical groove and the second helical groove are recessed and formed on opposite two side surfaces of the synchronization slider body along a first helical direction and a second helical direction respectively.

5. The foldable electronic device of claim 4, wherein the first helical direction is opposite to the second helical direction.

6. The foldable electronic device of claim 5, wherein the first rod extends along the first axis, the first carrying member comprises a first straight sliding groove extending substantially perpendicular to the first axis, the first transmission member further comprises a first extension plate and a first straight slider, two sides of the first extension plate are connected to the first straight slider and the first main driving cam respectively, the first extension plate extends along a radial direction of the first axis, the first straight slider is formed by extending outward from the first extension plate along a direction parallel to the first axis and is slidably disposed in the first straight sliding groove, and wherein the second rod extends along the second axis, the second carrying member comprises a second straight sliding groove extending substantially perpendicular to the second axis, the second transmission member further comprises a second extension plate and a second straight slider, two sides of the second extension plate are connected to the second straight slider and the second main driving cam respectively, the second extension plate extends along a radial direction of the second axis, the second straight slider is formed by extending outward from the second extension plate along a direction parallel to the second axis and is slidably disposed in the second straight sliding groove.

7. The foldable electronic device of claim 6, wherein the first axis, the first inner virtual axis, the first outer virtual axis, the second axis, the second inner virtual axis and the second outer virtual axis are parallel to each other and do not overlap.

8. The foldable electronic device of claim 7, wherein the pivot module comprises a fixed base, a first shaft hole and a second shaft hole, and the fixed base has a first wing portion and a second wing portion, wherein the first shaft hole is formed through the first wing portion along the first axis, and the first rod passes through the first shaft hole, and wherein the second shaft hole is formed through the second wing portion along the second axis, and the second rod passes through the second shaft hole.

9. The foldable electronic device of claim 8, wherein the first driven cam is sleeved on the first rod, the second driven cam is sleeved on the second rod, the first main driving cam and the first driven cam are matched and engaged with each other, and the second main driving cam and the second driven cam are matched and engaged with each other, wherein the elastic module further comprises a first elastic member and a second elastic member sleeved on the first rod and the second rod respectively, two ends of the first elastic member abut against the first wing portion and the first driven cam respectively, two ends of the second elastic member abut against the second wing portion and the second driven cam respectively, wherein when the first panel body and the second panel body are in a semi-unfolded state between the unfolded state and the folded state, the first main driving cam and the second main driving cam abut against the first driven cam and the second driven cam, such that the first elastic member and the second elastic member are compressed, and wherein when the first carrying member and the second carrying member are in the unfolded state or the folded state, the first elastic member and the second elastic member are released correspondingly.

10. The foldable electronic device of claim 9, wherein the first elastic member and the second elastic member are respectively a compressive spring.

11. The foldable electronic device of claim 1, wherein the first wing member further comprises a first support plate, the second wing member further comprises a second support plate, and the body portion has an upper surface, wherein when the first panel body and the second panel body are in the unfolded state, the first support plate, the second support plate and the lifting plate are coplanar, and the lifting plate is spaced apart from the upper surface, and wherein when the first panel body and the second panel body are in the folded state, the lifting plate is in contact with the upper surface, the first support plate and the second support plate are respectively oblique to the body portion, and one end of the first support plate adjacent to the first carrying member and one end of the second support plate adjacent to the second carrying member are close to each other.

12. The foldable electronic device of claim 11, wherein the first wing member further comprises a first abutting portion adjacent to the first inner arc-shaped slideway and exposed from the first support plate, the second wing member further comprises a second abutting portion adjacent to the second inner arc-shaped slideway and exposed from the second support plate, and the central base further comprises a housing covering the body portion, wherein when the first panel body and the second panel body are in the unfolded state, the first abutting portion and the second abutting portion jointly abut against the lifting plate at the highest position, and wherein when the first panel body and the second panel body are in the folded state, the first abutting portion and the second abutting portion are away from the lifting plate and in contact with two opposite inner sides of the housing respectively.

13. The foldable electronic device of claim 12, wherein the central base further comprises a plurality of magnets embedded in the body portion, and the magnets constantly provide a magnetic force to the lifting plate to make the lifting plate tend to settle toward the lowest position, and wherein when the first panel body and the second panel body are in the folded state, the magnets attract the lifting plate to make the lifting plate settle and in contact with the upper surface.

14. The foldable electronic device of claim 13, wherein the flexible screen further comprises a first slightly bent area and a second slightly bent area, wherein the first slightly bent area is located correspondingly between the first carrying member and the first support plate, and the first outer virtual axis is located at a midpoint of the first slightly bent area in a thickness direction of the first slightly bent area, wherein the second slightly bent area is located correspondingly between the second carrying member and the second support plate, and the second outer virtual axis is located at a midpoint of the second slightly bent area in a thickness direction of the second slightly bent area, and wherein when the first panel body and the second panel body are in the folded state, compression and expansion of corresponding two sides of the first slightly bent area are the same as those of corresponding two sides of the second slightly bent area.

* * * * *